United States Patent [19]

Trent

[11] Patent Number: 5,682,704
[45] Date of Patent: Nov. 4, 1997

[54] FISH HOOK SHROUD

[76] Inventor: Billy E. Trent, Rte. 1, Box 706, Rose Hill, Va. 24281

[21] Appl. No.: 591,884

[22] Filed: Jan. 25, 1996

[51] Int. Cl.$^6$ ............................................. A01K 87/00
[52] U.S. Cl. ............................................. 43/25.2; 43/57.2
[58] Field of Search ............................. 43/25.2, 57.1, 43/57.2, 54.1; 206/315.11; 224/920

[56] References Cited

U.S. PATENT DOCUMENTS

| D. 220,432 | 4/1971 | Leroue | 43/57.1 |
|---|---|---|---|
| 2,952,206 | 9/1960 | Becksted | 43/57.1 |
| 3,226,874 | 1/1966 | Boyd | 43/57.1 |
| 4,769,941 | 9/1988 | Schmidt | 43/57.1 |
| 4,866,875 | 9/1989 | Bliven | 43/57.1 |
| 5,020,264 | 6/1991 | Demski | 43/25.2 |
| 5,448,851 | 9/1995 | Nybers | 43/25.2 |

FOREIGN PATENT DOCUMENTS

| 1142119 | 9/1957 | France | 43/57.1 |
|---|---|---|---|

*Primary Examiner*—Joseph J. Hail, III

[57] ABSTRACT

A fish hook shroud device having a generally tubular shaped body with a generally longitudinal dimension and axis and having an axial bore defined by a substantially circular cross-section wall, the bore being adapted to slidably receive a fishing rod and its eyelet structures and its line with a hook or lure thereon, an aperture formed thru the wall of the body and adapted to allow one of the eyelet structures to project therethrough, and a wedge-shaped locking tongue on the body and adapted for insertion and wedging between spaced portions of the eyelet structure to prevent longitudinally directed motion of the shroud device along the fishing rod.

13 Claims, 2 Drawing Sheets

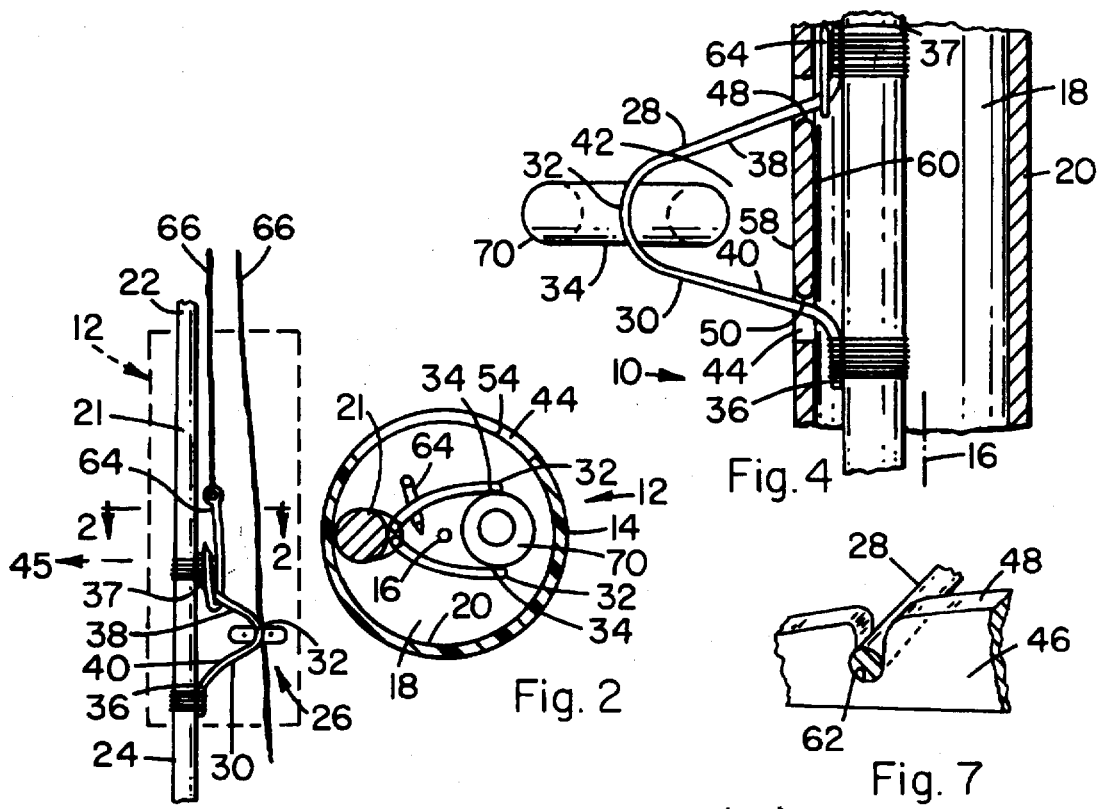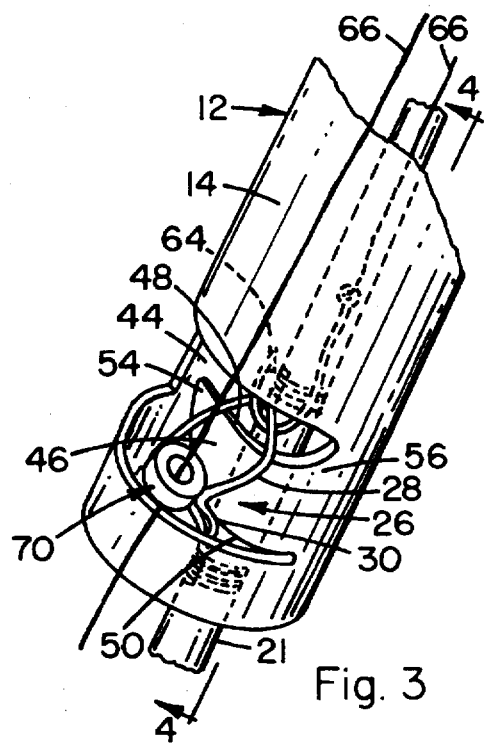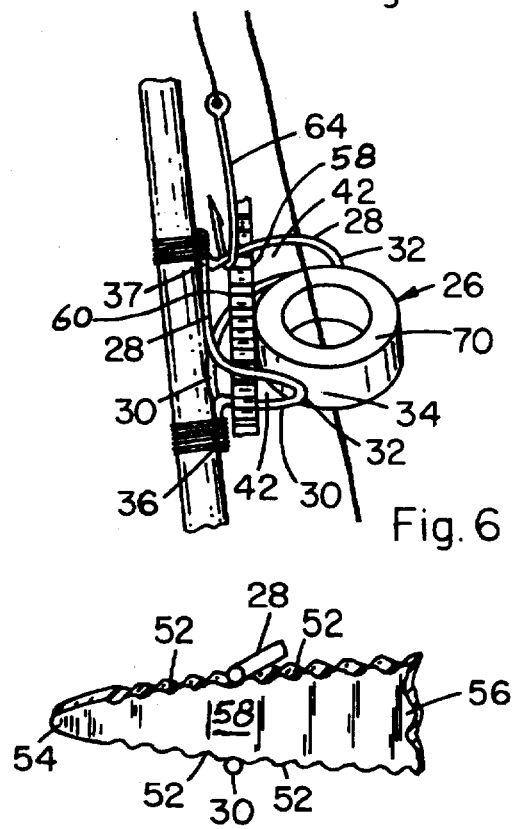

FISH HOOK SHROUD

FIELD OF THE INVENTION

This invention concerns a shroud for retaining a fish hook in a protected position on the rod when not in use whereby both the hook and persons in the vicinity of the rod will not be damaged.

DISCUSSIONS OF PRIOR ART

Heretofore, many devices for so protecting a fish hook and persons and items therefrom have been devised such as shown, for example, in U.S. Pat. Nos. 5,430,969; 5,214,874; 4,203,245; 4,441,274; 3,521,393; 3,190,027; 4,944,111; 2,711,611; 2,616,209; 1,505,235. These devices however, are relatively complex and expensive in construction and use and do not afford such convenience of operation as to be widely acceptable to the trade.

OBJECTS OF THE INVENTION

Objects, therefore, of the invention are: to provide a very inexpensive and structurally simple device for shrouding a fish hook or lure, whereby the device can be made to a single set of dimensions for accommodating practically any fishing rod and hook or lure size; and to provide such a device which has no moving parts, is extremely easy to use and which can be manufactured readily from off-the-shelf plastic tubing such as polyethylene, polypropylene, cellulosics, PVC, polycarbonate, polyamide, polyester or the like.

SUMMARY OF THE INVENTION

These and other objects have been attained in accordance with the present invention thru the discovery of shroud construction which is defined in one of its broad embodiments as a fish hook shroud device comprising a generally tubular shaped body means preferably of plastic tubing as aforesaid and having a generally longitudinal dimension and axis and having an axial bore means defined by wall means, said bore means being adapted to slidably receive a fishing rod having a distal end and a proximal end and a plurality of eyelet means longitudinally spaced therealong, wherein said bore means is of sufficient internal diameter to readily slidably accommodate said fishing rod and at least one of its intermediate eyelet means and a line with hook attached, wherein each of said eyelet means is affixed to said rod by at least one pair of distal and proximal leg means, wherein each of said leg means has one end affixed to an edge portion of an eyelet means and having its other end affixed to said rod whereby portions of said distal and proximal leg means are spaced apart in a longitudinal direction of said rod, thereby providing a gap between said portions, aperture means formed thru said wall means and adapted to allow one of said eyelet means and said portions of said leg means thereof to project therethrough, and locking tongue means on said body means having longitudinally spaced upper and lower edge means, said tongue means extending in a generally lateral direction on said body means within the perimeter of said aperture means and adapted to pass thru said gap whereby at least said upper edge means engages said distal leg means to prevent longitudinally directed motion of said shroud device along said rod.

In certain preferred aspects of the above embodiment:

(a) at least one of said edge means is provided with shoulder means formed generally laterally thereacross for receiving in a nested manner one of said leg means for preventing inopportune withdrawal of said tongue means from said gap means;

(b) said tongue means has an insertion end and a mounting end and generally wedge shaped sides which widen in a wedge-shaped manner from said insertion end to said mounting end;

(c) both said edge means are in frictional contact with their contiguous leg means such that said tongue means is wedged therebetween and is withdrawable form said gap means by a conscious rotating or lateral force applied to said body;

(d) fish hook means is trapped between said wall means and said rod and wherein said tongue means is wedged between said distal and proximal leg means; and (e) said shoulder means defines a snap-in slot means formed generally axially in one of said edge means, which slot means is adapted to frictionally, slidably receive and hold to one of said leg means.

In a most preferred embodiment of the present fish hook shroud device and fishing rod combination, the shroud device comprises a generally tubular shaped body means having a generally longitudinal dimension and axis and having an axial bore defined by wall means, said rod having a longitudinal axis, a distal end, a proximal end and at least one eyelet means mounted thereon, said wall means being of sufficient internal diameter to readily slidably accommodate said fishing rod and eyelet means and a line with hook attached, said eyelet means having a disc segment with a line hole formed therethrough in a generally axial direction relative to said longitudinal axis, and further having leg means having one of its ends affixed to an outer edge portion of said disc segment and having its other end affixed to said rod, perimeter means on said wall means defining aperture means formed thru said wall means and adapted to allow a portion of said disc segment to project within said perimeter means, and locking tongue means on said body means and extending within said perimeter means and adapted for insertion thru said line hole and into frictional engagement with portions of the inner periphery thereof for resisting longitudinally directed motion of said shroud device along said rod toward its distal end.

BRIEF DESCRIPTION OF THE DRAWINGS

The present invention will be further understood from the following drawings and description of certain preferred embodiments, wherein:

FIG. 1 is a side view of a portion of a fishing rod with the present shroud device shown in dotted outline in its initial position over the rod and hook;

FIG. 2 is a cross-sectional view taken along line 2—2 of FIG. 1 in the direction of the arrows with the shroud device also shown in cross-section;

FIG. 3 is an isometric view of the shroud device of FIGS. 1 and 2 with the rod, line and hook in operating relationship, with the hook in a trapped or protected position, and with portions of the shroud broken away for clarity;

FIG. 4 is a cross-sectional view taken along line 4—4 of FIG. 3 in the direction of the arrows showing the hook trapped between the rod and the shroud;

FIG. 5 is an isometric view of a variation of the locking tongue means configuration;

FIG. 6 is an isometric view of the rod and hook with the tongue means of FIG. 5 in locking position; and FIG. 7 is a snap-in slot means variation of the locking tongue means configuration.

DETAILED DESCRIPTION OF THE DRAWINGS

Figure 8:
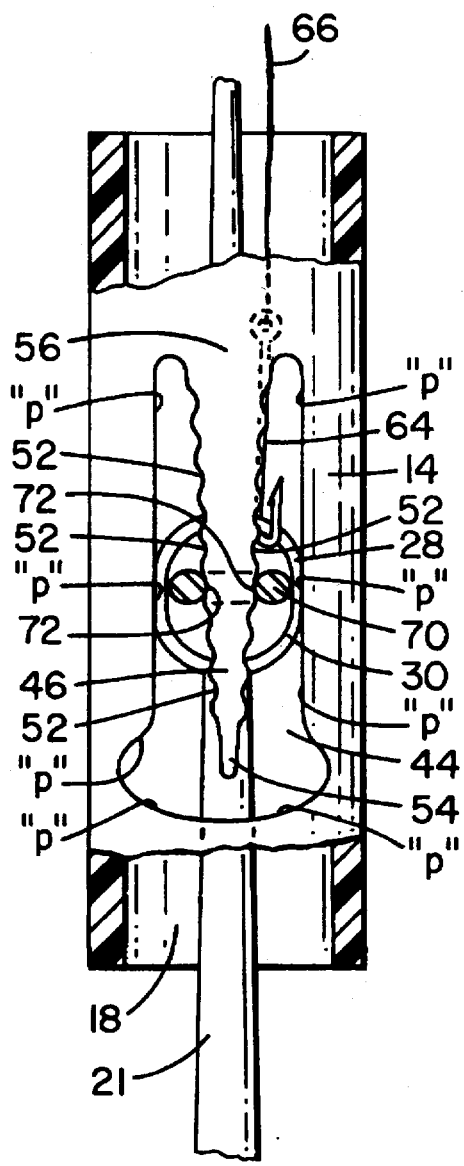
FIG. 8 is a front view of a most preferred embodiment of the fishing rod/shroud device combination as in actual use with portions of the body means broken away for clarity.

Referring to the drawings and with particular reference to the claims hereof, the present fish hook shroud device and fishing rod combination generally designated 10 comprises shroud device 12 having a generally tubular shaped body means 14 having a generally longitudinal dimension and axis 16 and having an axial bore 18 defined by wall means 20, the rod 21 having a distal end 22 and a proximal end 24 having a rod handle portion (not shown), and a plurality of eyelet means generally designated 26 longitudinally spaced therealong, said wall means 20 being of sufficient internal diameter to readily slidably accommodate the fishing rod, line and hook and at least one of the intermediate eyelet means positioned between the rod ends, each of the eyelet means being affixed to the rod by at least one pair of distal 28 and proximal 30 leg means, each of which leg means has one end portion 32 affixed to an edge portion 34 of an eyelet means and having its other ends 36, 37 affixed to said rod whereby portions 38 and 40 of said distal and proximal leg means respectively are spaced apart in a longitudinal direction of the rod to provide a gap 42 therebetween, aperture means 44 formed thru said wall means and adapted to allow one of said eyelet means and said portions of said leg means thereof to project therethrough, and locking tongue means 46 on said body means having longitudinally spaced upper 48 and lower 50 edge means, said tongue means extending in a generally lateral direction on said body means within the perimeter of said aperture means and adapted to pass thru said gap whereby at least said upper edge means engages said distal leg means to prevent longitudinally directed motion of said shroud device along the rod.

As shown in FIGS. 5 and 6 at least one of said edge means is provided with shoulder means 52 formed generally laterally thereacross for receiving in a nested manner one of said leg means for preventing inopportune withdrawal of said tongue means from said gap means. The tongue means has an insertion end 54 and a mounting end 56 preferably formed integrally with body means 14 and preferably has generally wedge shaped sides 58, 60 which widen in a wedge shaped manner from said insertion end to said mounting end.

In FIG. 7 is shown a variation of the shoulder means 52 as being a snap-in slot means 62 formed thru the upper edge 48 of the tongue 46 and which is adapted to frictionally receive and retain the distal leg 28 of the eyelet support. A downward thrust on the tongue will dislodge it from the leg.

In operation, a single or multiple hook 64 or lure 65 provided therewith is affixed to a fishing line 66 and is hooked under the distal leg 28 of one of the eyelet means such as the second or third eyelet means down from the distal end of a typical fishing rod. The shroud device 12 is then slid down over said distal end until aperture means 44 is adjacent the eyelet means. The shroud device is then moved laterally in the direction of dotted line 45 in FIG. 1 to move said eyelet means thru said aperture means. At this point, the insertion end 54 of the tongue is passed thru gap 42, preferably a sufficient distance to wedge the tongue between the distal 28 and proximal 30 legs of the eyelet means. This insertion is accomplished by rotating the body means 14 clockwise with reference to FIG. 3.

Figure 9:
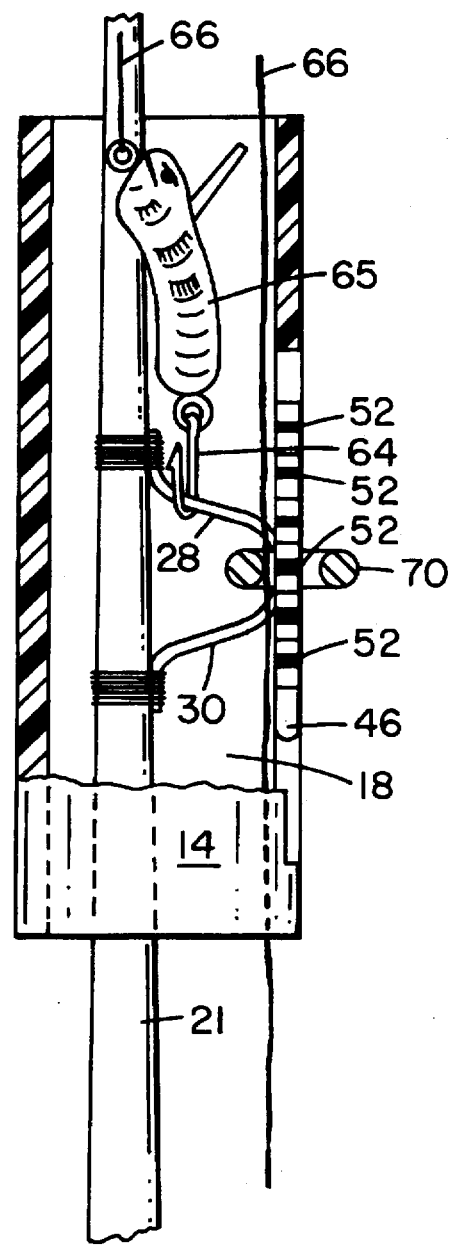
FIG. 9 is a side view of the combination of FIG. 8 showing a lure covered with the present device.

Referring to FIGS. 8 and 9 wherein structural items which are essentially equivalent in configuration and function to those of FIGS. 1–7 are numbered the same, the tongue means 46 extends substantially axially of the body means 14 within the perimeter or defining wall edges "p" of aperture means 44. In this preferred embodiment, the body means 14 need only be moved downwardly over the rod, eyelet and hook or lure with the tongue means passing into and thru the line hole 68 formed in the disc segment 70 of the eyelet means. Such movement will forcibly engage portions 72 of the inner periphery of hole 68 into the grooves or shoulder means 52 formed in the edges of the tongue means and thereby resist extraction of the tongue means from the disc 70.

It is particularly noted that it is highly preferred to use a plastic material such as low density polyethylene for the body means since such material allows the tongue means to readily compress or at least deform as it is wedged into hole 68 such that the grooves or shoulder means 52 can get a good frictional grip on portions 72 of the hole periphery. Also, such material will allow the perimeter edges "p" to be easily deformed outwardly, if necessary, as the tongue means is moved thru hole 68, such that aperture means 44 does not have to be made too large and possibly expose the hook. The shape of aperture means 44 can be varied and is not critical to the invention. It is preferred however, that the lower section of said aperture means be formed sufficiently wide to allow easy maneuvering of the tongue end 54 into the line hole 68.

The invention has been described in detail with particular reference to preferred embodiment thereof, but it will be understood that variations and modifications will be effected with the spirit and scope of the invention.

I claim:

1. A fish hook shroud device and fishing rod combination, said shroud device comprising a generally tubular shaped body means having a generally longitudinal dimension and axis and having an axial bore defined by wall means, said rod having a longitudinal axis, a distal end, a proximal end and at least one eyelet means mounted thereon, said wall means being of sufficient internal diameter to readily slidably accommodate said fishing rod and eyelet means and a line with hook attached, said eyelet means having a disc segment with a line hole formed therethrough in a generally axial direction relative to said longitudinal axis, and further having leg means having one of its ends affixed to an outer edge portion of said disc segment and having its other end affixed to said rod, perimeter means on said wall means defining aperture means formed thru said wall means and adapted to allow a portion of said disc segment to project within said perimeter means, and locking tongue means on said body means and extending within said perimeter means and adapted for insertion thru said line hole and into frictional engagement with portions of the inner periphery thereof for resisting longitudinally directed motion of said shroud device along said rod toward its distal end.

2. The combination of claim 1 wherein said tongue means has opposed edge means at least one of which is provided with shoulder means formed generally laterally thereacross for receiving in a nested manner said portions of said inner periphery of said line hole for resisting inopportune disengagement of said tongue means therefrom.

3. The combination of claim 1 wherein said tongue means has an insertion end and a mounting end and generally wedge-shaped sides which widen in a wedge-shaped manner from said insertion end to said mounting end.

4. A fish hook shroud device and fishing rod combination, said shroud device comprising a generally tubular shaped body means having a generally longitudinal dimension and axis and having an axial bore defined by wall means, said rod having a distal end and a proximal end and a plurality of eyelet means longitudinally spaced therealong, said wall means being of sufficient internal diameter to readily slidably accommodate said fishing rod and at least-one of its intermediate eyelet means and a line with hook attached, each of said eyelet means being affixed to said rod by at least one pair of distal and proximal leg means, each of which leg means has one end affixed to an edge portion of an eyelet means and having its other end affixed to said rod whereby portions of said distal and proximal leg means are spaced apart in a longitudinal direction of said rod, thereby providing a gap means between said portions, aperture means formed thru said wall means and adapted to allow one of said eyelet means and said portions of said leg means thereof to project therethrough, and locking tongue means on said body means having longitudinally spaced upper and lower edge means, said tongue means extending in a generally lateral direction on said body means within the perimeter of said aperture means and adapted to pass thru said gap means whereby at least said upper edge means engages said distal leg means to prevent longitudinally directed motion of said shroud device along said rod.

5. The combination of claim 4 wherein at least one of said edge means is provided with shoulder means formed generally laterally thereacross for receiving in a nested manner one of said leg means for preventing inopportune withdrawal of said tongue means from said gap means.

6. The combination of claim 5 wherein both said edge means are in frictional contact with their contiguous leg means such that said tongue means is wedged therebetween and is withdrawable form said gap means by a conscious rotating or lateral force applied to said body.

7. The combination of claim 5 wherein said shoulder means defines a snap-in slot means formed generally axially in one of said edge means, which slot means is adapted to frictionally, slidably receive and hold to one of said leg means.

8. The combination of claim 4 wherein said tongue means has an insertion end and a mounting end and generally wedge shaped sides which widen in a wedge-shaped manner from said insertion end to said mounting end.

9. The combination of claim 4 wherein fish hook means is trapped between said wall means and said rod and wherein said tongue means is wedged between said distal and proximal leg means.

10. A fish hook shroud device comprising a tubular shaped body means having a generally longitudinal dimension and axis and having an axial bore means defined by wall means, said wall means being solid, substantially rigid and substantially continuous, said bore means being adapted to slidably receive a fishing rod, a line and hook and its eyelet means, aperture means formed thru said wall means and adapted to allow at least a portion of an eyelet means of a fishing rod to project therethrough, and wedge-shaped locking tongue means on said body means extending generally longitudinally on said body means and adapted to be inserted through the line hole of said eyelet means and become wedged therein to resist longitudinally directed motion of said shroud device along the fishing rod.

11. The shroud device of claim 10 wherein said tongue means is provided with opposed edge means and at least one of said edge means is provided with groove means formed generally laterally thereacross for receiving in a nested manner a portion of the inner diameter wall surface of said line hole for preventing inopportune withdrawal of said tongue means therefrom.

12. The shroud device of claim 11 wherein said tongue means has an insertion end and a mounting end and generally wedge-shaped sides which widen in a wedge-shaped manner from said insertion end toward said mounting end, and wherein said tongue means is provided with opposed edge means and at least one of said edge means is provided with groove means formed generally laterally thereacross for receiving in a nested manner a portion of the inner diameter wall surface of said line hole for preventing inopportune withdrawal of said tongue means therefrom.

13. A fish hook shroud device for covering a fish hook and having a generally tubular shaped body comprised of a solid, substantially rigid, substantially circular in cross-section, and substantially continuous wall means, said body having a longitudinal dimension and axis and having an axial bore defined by said wall means, said bore being adapted to slidably receive a fishing rod and its eyelet structures and its line with a hook or lure thereon, an aperture formed thru said wall means and adapted to allow one of said eyelet structures to project therethrough, and a wedge-shaped locking tongue on said body and adapted for insertion and wedging between spaced portions of the eyelet structure to prevent longitudinally directed motion of the shroud device along the fishing rod.

* * * * *